(12) United States Patent
Zhang

(10) Patent No.: US 10,448,248 B2
(45) Date of Patent: Oct. 15, 2019

(54) METHODS AND DEVICES FOR CONTROLLING AUTHORIZATION TO COMMUNICATION INFORMATION

(71) Applicant: Lenovo (Beijing) Limited, Beijing (CN)

(72) Inventor: Jing Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 15/353,490

(22) Filed: Nov. 16, 2016

(65) Prior Publication Data
US 2017/0142583 A1 May 18, 2017

(30) Foreign Application Priority Data
Nov. 16, 2015 (CN) .......................... 2015 1 0782851

(51) Int. Cl.
*H04W 12/06* (2009.01)
*H04W 12/08* (2009.01)
(Continued)

(52) U.S. Cl.
CPC .......... *H04W 12/06* (2013.01); *H04W 12/08* (2013.01); *H04W 8/183* (2013.01); *H04W 76/14* (2018.02)

(58) Field of Classification Search
CPC ... H04W 12/06; H04W 12/08; H04W 76/023; H04W 8/183
(Continued)

(56) References Cited

U.S. PATENT DOCUMENTS

2012/0117635 A1* 5/2012 Schell ................. G06F 21/34
726/9
2016/0021691 A1* 1/2016 Lee ..................... H04W 12/06
455/435.1
(Continued)

FOREIGN PATENT DOCUMENTS

CN 101345789 A 1/2009
CN 103501381 A 1/2014
(Continued)

*Primary Examiner* — Shahriar Behnamian
(74) *Attorney, Agent, or Firm* — Kunzler Bean & Adamson

(57) ABSTRACT

One method includes receiving, at a first electronic device, communication information via a wireless communication network. The method also includes obtaining, via the first electronic device, user attribute information corresponding to the communication information. The method includes determining, via the first electronic device and based on the user attribute information, whether authorization of the first electronic device to the communication information is to be obtained prior to processing the communication information. The method also includes in response to determining that authorization of the first electronic device to the communication information is to be obtained: sending, from the first electronic device, an authorization request to a second electronic device; and processing, via the first electronic device, the communication information in response to receiving a favorable response from the second electronic device, and not processing the communication information in response to receiving an unfavorable response from the second electronic device.

14 Claims, 5 Drawing Sheets

(51) Int. Cl.
*H04W 76/14* (2018.01)
*H04W 8/18* (2009.01)

(58) Field of Classification Search
USPC .......................................................... 455/411
See application file for complete search history.

(56) References Cited

U.S. PATENT DOCUMENTS

2016/0087957 A1* 3/2016 Shah .................... H04L 63/205
726/1
2016/0323256 A1* 11/2016 Shahidi ................... H04L 63/18
2017/0070346 A1* 3/2017 Lombardi ........... H04L 63/0428

FOREIGN PATENT DOCUMENTS

| CN | 104657643 A | 5/2015 |
| CN | 104955022 A | 9/2015 |
| CN | 105049559 A | 11/2015 |
| WO | 2015016524 A1 | 2/2015 |

* cited by examiner

Send Authorization Request Information to a Second Electronic Device — 301

Receive Response Information From the Second Electronic Device Based on the Authorization Request Information, and Determine Whether a First Electronic Device is Authorized to Process the Communication Information Based on the Response Information — 302

FIG. 3

Generate a Request for User Input — 401

Receive the User Input in Response to the Request — 402

Determine Whether the First Electronic Device is Authorized to Process the Communication Information based on a Comparison Between the User Input and a Preset User Input — 403

FIG. 4

METHODS AND DEVICES FOR CONTROLLING AUTHORIZATION TO COMMUNICATION INFORMATION

FIELD

The subject matter disclosed herein relates to information handling devices, and, more specifically to controlling authorization to communication information for information handling devices.

BACKGROUND

In certain environments, subscriber identity modules ("SIMs") are used. In one configuration, two different electronic devices use one subscriber identity module ("SIM") card. In such a configuration, a virtual SIM ("VSIM") technology may be used. Specifically, a virtual customer identification module may be arranged in a first electronic device and a customer identification module may be arranged in a second electronic device. The virtual customer identification module of the first electronic device may be registered to a network service corresponding to the customer identification module of the second electronic device. Moreover, the first electronic device may perform the network service corresponding to the customer identification module by means of the customer identification module arranged in the second electronic device, and may use a card-machine separating use mode. The card-machine separating use mode may cause the user of the electronic device to be subject to a security breach.

SUMMARY

A method for controlling authorization to communication information is disclosed. Devices also perform the functions of the apparatus. In one embodiment, the method includes receiving, at a first electronic device, communication information via a wireless communication network. The method also includes obtaining, via the first electronic device, user attribute information corresponding to the communication information. The method includes determining, via the first electronic device and based on the user attribute information, whether authorization of the first electronic device to the communication information is to be obtained prior to processing the communication information. The method also includes in response to determining that authorization of the first electronic device to the communication information is to be obtained: sending, from the first electronic device, an authorization request to a second electronic device; and processing, via the first electronic device, the communication information in response to receiving a favorable response from the second electronic device, and not processing the communication information in response to receiving an unfavorable response from the second electronic device.

In certain embodiments, the communication information is received from a base station, and the communication information is based on customer identification information. In some embodiments, the method includes obtaining, via the first electronic device, the customer identification information from the second electronic device. In one embodiment, the method includes: generating, via the first electronic device, a request for user input; sending, via the first electronic device, the request to the second electronic device; receiving, via the first electronic device, the user input; and determining, via the first electronic device, whether the first electronic device is authorized to process the communication information based on a comparison between the user input and a preset user input.

In various embodiments, the first electronic device processes the communication information in response to determining that the authorization of the first electronic device to the communication information is not required. In certain embodiments, the customer identification information includes a telephone number. In one embodiment, the first electronic device includes a subscriber identity module.

In various embodiments, the first electronic device includes a virtual customer identification module, and the second electronic device includes a customer identification module. In one embodiment, the user attribute information corresponds to a user identity.

In one embodiment, a first electronic device includes a processor and a wireless communication module coupled to the processor, the wireless communication module configured to receive communication information via a wireless communication network. In such an embodiment, the processor is configured to: obtain user attribute information corresponding to the communication information; determine, based on the user attribute information, whether authorization of the first electronic device to the communication information is to be obtained prior to processing the communication information; and in response to determining that authorization of the first electronic device to the communication information is to be obtained: send an authorization request to a second electronic device; and process the communication information in response to receiving a favorable response from the second electronic device, and not process the communication information in response to receiving an unfavorable response from the second electronic device.

In certain embodiments, the communication information is received from a base station, and the communication information is based on customer identification information. In some embodiments, the wireless communication module is further configured to obtain the customer identification information from the second electronic device. In various embodiments, the processor is further configured to: generate a request for user input for sending to the second electronic device via the wireless communication module; receive a response from the second electronic device via the wireless communication module, wherein the response from the second device is based on a comparison between the user input and a preset user input; and determine whether the first electronic device is authorized to process the communication information.

In certain embodiments, the processor is configured to process the communication information in response to determining that the authorization of the first electronic device to the communication information is not required. In some embodiments, the first electronic device includes a subscriber identity module. In various embodiments, the first electronic device includes a virtual customer identification module adapted to rely on information received from the second electronic device via the wireless communication module to connect with the wireless communication network.

In some embodiments, a second electronic device includes a processor and a wireless communication module coupled to the processor. In one embodiment, the wireless communication module is configured to: receive an authorization request from a first electronic device, wherein the authorization request is received in response to the first electronic device receiving communication information via a wireless communication network; and send a favorable response to the first electronic device to indicate that the first electronic device is authorized to process the communication information.

In one embodiment, the communication information is received from a base station, and the communication information is based on customer identification information. In some embodiments, the wireless communication module is further configured to transmit the customer identification information to the first electronic device. In various embodiments, the second electronic device includes a registering unit configured to register the second electronic device with the base station based on the customer identification information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which:

FIG. 3 is schematic flow chart diagram of a further embodiment of a method for controlling authorization to communication information;

FIG. 4 is schematic flow chart diagram of yet another embodiment of a method for controlling authorization to communication information;

DETAILED DESCRIPTION

Figure 1:
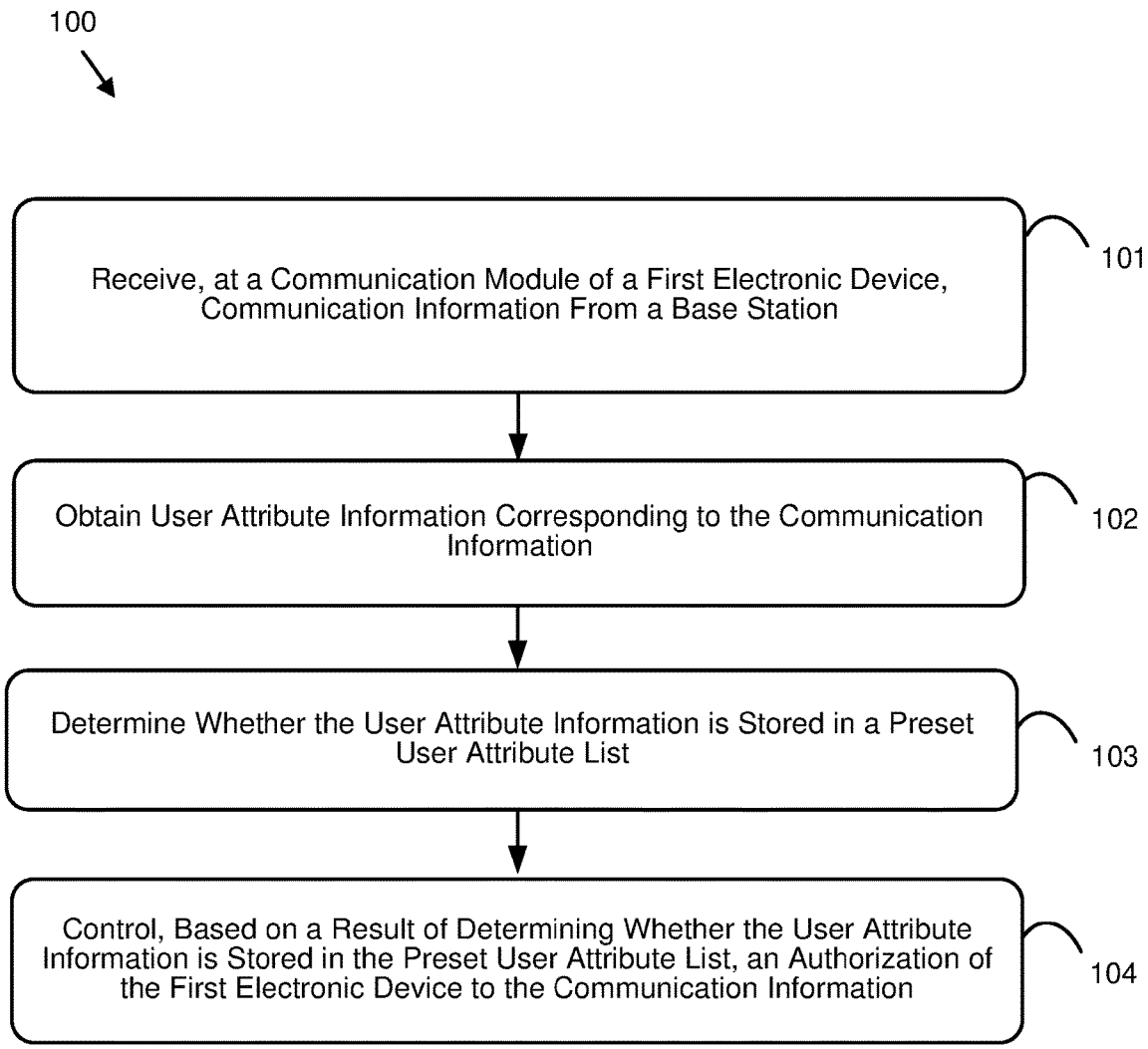
FIG. 1 is schematic flow chart diagram of an embodiment of a method for controlling authorization to communication information.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is schematic flow chart diagram of an embodiment of a method 100 for controlling authorization to communication information. The method 100 may be performed by a first electronic device. The method 100 includes receiving 101, at a first communication module of a first electronic device, communication information from a base station. The communication information may be based on customer identification information, and the customer identification information may correspond to identification information obtained in response to a second electronic device registering at the base station. The second electronic device may include a second communication module for sending and/or receiving communications.

In some embodiments, the first electronic device may communicate with the second electronic device by way of a wireless communication network, for example, Bluetooth®, wireless fidelity ("Wi-Fi"), and the like. The first communication module and the second communication module may each send and/or receive data using a base band antenna.

In one embodiment, a main SIM is arranged in the second electronic device. The customer identification information may be identification information corresponding to when the second electronic device registers at the base station using the main SIM. The customer identification information may, in certain embodiments, be a communication identifier (e.g., a telephone number, and/or the like). Moreover, in certain embodiments, an auxiliary SIM (e.g., a virtual SIM) is arranged in the first electronic device. Accordingly, the first electronic device and the second electronic device may share one actual SIM, and have a same customer identification identifier at the base station.

In various embodiments, if the virtual SIM is arranged in the first electronic device, receiving 101 communication information from a base station through a first communication module may include receiving communication information from a base station side through a virtual SIM and a first communication module.

In one embodiment, the main SIM in the second electronic device may be a solid structure and/or a virtual structure as long as a SIM function is capable of being performed. In some embodiments, the virtual SIM in the first electronic device may be a solid structure and/or a virtual structure as long as a SIM function is capable of being performed.

The method 100 includes obtaining 102 user attribute information corresponding to the communication information. In some embodiments, the user attribute information may be a user identifier corresponding to the communication information and/or any information capable of representing a user identity (e.g., name).

The method 100 includes determining 103 whether the user attribute information is stored in a preset user attribute list. In one embodiment, the preset user attribute list is a user attribute list preselected by a user according to actual demands (e.g., a user attribute list preselected by the user according to actual demands in the first electronic device, a user attribute list preselected by the user according to actual demands in the second electronic device). In certain embodiments, if the preset user attribute list is selected in the second electronic device, before determining 103, the method 100 may include the first electronic device receiving the preset user attribute list from the second electronic device.

The method 100 includes controlling 104, based on a result of determining whether the user attribute information is stored in the preset user attribute list, an authorization of the first electronic device to the communication information.

Thus, the first electronic device is not only able to receive, based on the customer identification information, the communication information sent from the base station side and share the same customer identification information with the second electronic device, but is also able to process the communication information based on the preset user attribute list, thereby avoiding security issues and enhancing user experience.

Figure 2:
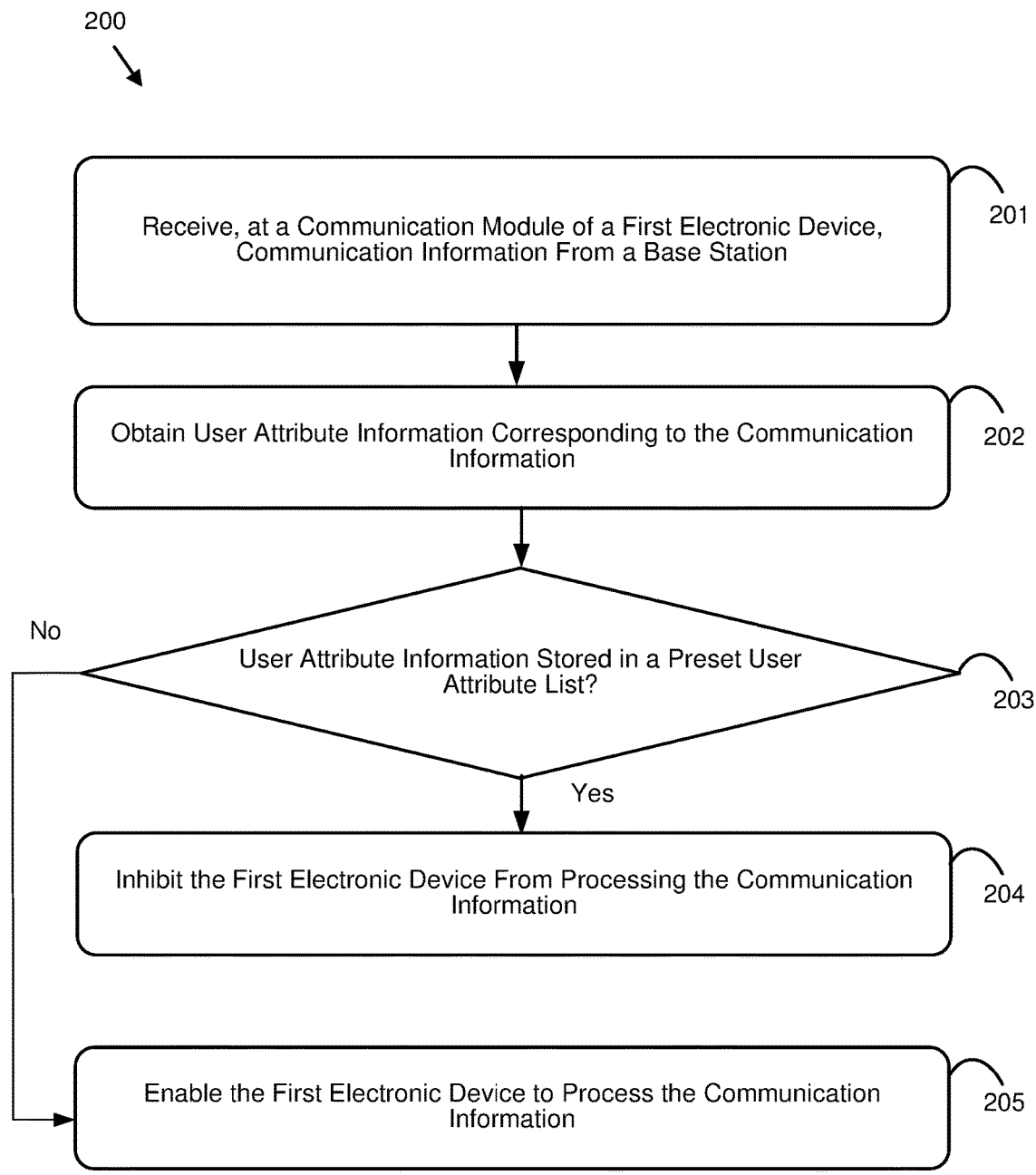
FIG. 2 is schematic flow chart diagram of another embodiment of a method for controlling authorization to communication information.

FIG. 2 is schematic flow chart diagram of another embodiment of a method 200 for controlling authorization to communication information. The method 200 may be performed by a first electronic device. The method 200 includes receiving 201, at a first communication module of a first electronic device, communication information from a base station. The communication information may be based on customer identification information, and the customer identification information may correspond to identification information obtained in response to a second electronic device registering at the base station. The second electronic device may include a second communication module for sending and/or receiving communications.

In some embodiments, the first electronic device may communicate with the second electronic device by way of, for example, Bluetooth®, Wi-Fi, and the like. The first communication module and the second communication module may each send and/or receive data using a base band antenna.

In one embodiment, a main SIM is arranged in the second electronic device. The customer identification information may be identification information corresponding to when the second electronic device registers at the base station using the main SIM. The customer identification information may, in certain embodiments, be a communication identifier (e.g., a telephone number, and/or the like). Moreover, in certain embodiments, an auxiliary SIM (e.g., a virtual SIM) is arranged in the first electronic device. Accordingly, the first electronic device and the second electronic device may share one actual SIM, and have a same customer identification identifier at the base station.

In various embodiments, if the virtual SIM is arranged in the first electronic device, receiving 201 communication information from a base station through a first communication module may include receiving communication information from a base station side through a virtual SIM and a first communication module.

In one embodiment, the main SIM in the second electronic device may be a solid structure and/or a virtual structure as long as a SIM function is capable of being performed. In some embodiments, the virtual SIM in the first electronic device may be a solid structure and/or a virtual structure as long as a SIM function is capable of being performed.

The method 200 includes obtaining 202 user attribute information corresponding to the communication information. In some embodiments, the user attribute information may be a user identifier corresponding to the communication information and/or any information capable of representing a user identity (e.g., name).

The method 200 includes determining 203 whether the user attribute information is stored in a preset user attribute list. In one embodiment, the preset user attribute list is a user attribute list preselected by a user according to actual demands (e.g., a user attribute list preselected by the user according to actual demands in the first electronic device, a user attribute list preselected by the user according to actual demands in the second electronic device). In certain embodiments, if the preset user attribute list is selected in the second electronic device, before determining 203, the method 200 may include the first electronic device receiving the present user attribute list from the second electronic device.

In the method 200, different processing strategies may be used for different results of determining 203 to control processing of the communication information by the first electronic device. Specifically, in response to the user attribute information being stored in the preset user attribute list, a higher level security strategy is used for the communication information, and in response to the user attribute information not being stored in the preset user attribute list, a lower level security strategy is used for the communication information, that is, the first electronic device is enabled to process the communication information, thereby facilitating different demands of a user and enhancing user experience.

In response to the user attribute information being stored in the preset user attribute list, the method 200 inhibits 204 the first electronic device from processing the communication information. Moreover, in response to the user attribute information not being stored in the preset user attribute list, the method 200 enables 205 the first electronic device to process the communication information.

Thus, the first electronic device is not only able to receive, based on the customer identification information, the communication information sent from the base station side and share the same customer identification information with the second electronic device, but is also able to process the first communication information based on the preset user attribute list, thereby avoiding security issues and enhancing user experience.

FIG. 3 is schematic flow chart diagram of a further embodiment of a method 300 for controlling authorization to communication information. In response to the method 200 inhibiting 204 the first electronic device from processing the communication information, the method 300 may send 301 authorization request information to the second electronic device. The method 300 may also receive 302 response information from the second electronic device and determine whether the first electronic device is authorized to process the communication information based on the response information. The response information may be based on the authorization request information.

Accordingly, the first electronic device sends the authorization request information to the second electronic device to facilitate the control of the second electronic device over the first electronic device, that is, facilitate the control of the second electronic device with the main SIM over the first electronic device with the auxiliary SIM, thereby enhancing the level of security.

FIG. 4 is schematic flow chart diagram of yet another embodiment of a method 400 for controlling authorization to communication information. In response to the method 200 inhibiting 204 the first electronic device from processing the communication information, the method 400 may generate 401 a request for user input (e.g., a prompt message). The method 400 may also receive 402 the user input in response to the request (e.g., receive a user operation based on the prompt message). The method 400 may determine 403 whether the first electronic device is authorized to process the communication information based on a comparison between the user input and a preset user input (e.g., preset user operation).

In certain embodiments, the first electronic device may preset the preset user input. Moreover, the preset user input may be a user input authenticated by the second electronic device. For example, the first electronic device may send a request for setting the preset user input to the second electronic device; in response the second electronic device may receive the request, authorize the request, and send authorization information to the first electronic device; and the first electronic device may receive the authorization information and set the preset user input.

In one embodiment, the preset user input may be any operation and/or input, such as a specific gesture, a sliding track, a character input by a user, and/or the like.

In some embodiments, similar to a process of setting the preset user input, if the preset user attribute list is set by the first electronic device, the setting process may be authenticated by the second electronic device. For example, the first electronic device may not set the preset user attribute list until it is authorized and/or authenticated by the second electronic device. As another example, the first electronic device may not pre-modify the preset user input and/or the preset user attribute list until authorized and/or authenticated by the second electronic device.

In various embodiments, through user input made by the user and in a manner of determining whether the user input matches with the preset user input authenticated by the second electronic device, the method 400 facilitates the second electronic device controlling the first electronic device to process the first communication request, and further facilitates control of the second electronic device with the main SIM over the first electronic device with the auxiliary SIM, thereby enhancing the level of security.

The method 400 may be accomplished as described in the following examples. In the examples that follow, the first electronic device may be referred to as a cell phone, and the second electronic device may be referred to as a watch. In a first example, a contact list menu of a cell phone may include an option allowing a user to select whether to perform privacy protection with an auxiliary SIM. In response to the user selecting to perform privacy protection, the user may select a contact on which to perform privacy protection, then a protection list (e.g., the preset user attribute list) is generated, and a protection password (e.g., the present user operation) is determined. Then, the preset user attribute list and the preset user operation may be authorized and authenticated by the watch. Further, in response to the cell phone receiving a call or text message in an open state of a VSIM function, the cell phone receives the contact (e.g., user attribute information) corresponding to the call or text message, and determines whether the contact is stored in the protection list. In response to the contact being stored in the protection list, then the cell phone sends a confirmation request to the watch provided with the main SIM card by Bluetooth® or Wi-Fi. After receiving the confirmation request, the watch prompts the watch user, and processing the call or text message by the cell phone is determined by a confirmation operation or refusal operation (e.g., confirmation input or refusal input) of the watch user. Specifically, if the watch user selects the confirmation operation, then the watch generates a permission command according to the confirmation operation and sends the permission command to the cell phone, and after receiving the permission command, the cell phone enables the cell phone user to answer the call or check the text message on the cell phone. If the watch user selects the refusal operation, then the watch generates a refusal command according to the refusal operation and sends the refusal command to the cell phone, and the cell phone blocks the cell phone user from answering the call and/or checking the text message according to the refusal command. If the watch user has no operation in a preset time, the cell phone device keeps a state of blocking the cell phone user from answering the call and/or checking the text message.

In another example, if it is determined that the contact is stored in the protection list, the cell phone may generates a request for user input and prompt the cell phone user to input a protection password, and if the cell phone user does not input the password or inputs a wrong password, then the cell phone may block the cell phone user from answering the call and/or checking the text message.

In certain embodiments, password protection or sending a confirmation request may be performed at substantially the same time. Specifically, if the watch user selects the refusal operation or the permission command of the watch device is not sent to the cell phone successfully, the cell phone user may bypass the protection by inputting the protection password to the cell phone.

Further, if a user desires to modify an established protection list, the cell phone user may send a request to the watch, and the user may not modify the protection list until the watch confirms and/or a password is input. Similarly, when exiting a VSIM function, a cell phone may receive confirmation from the watch, and may not execute an exiting operation until a confirmation is received and/or a password is input.

Figure 5:
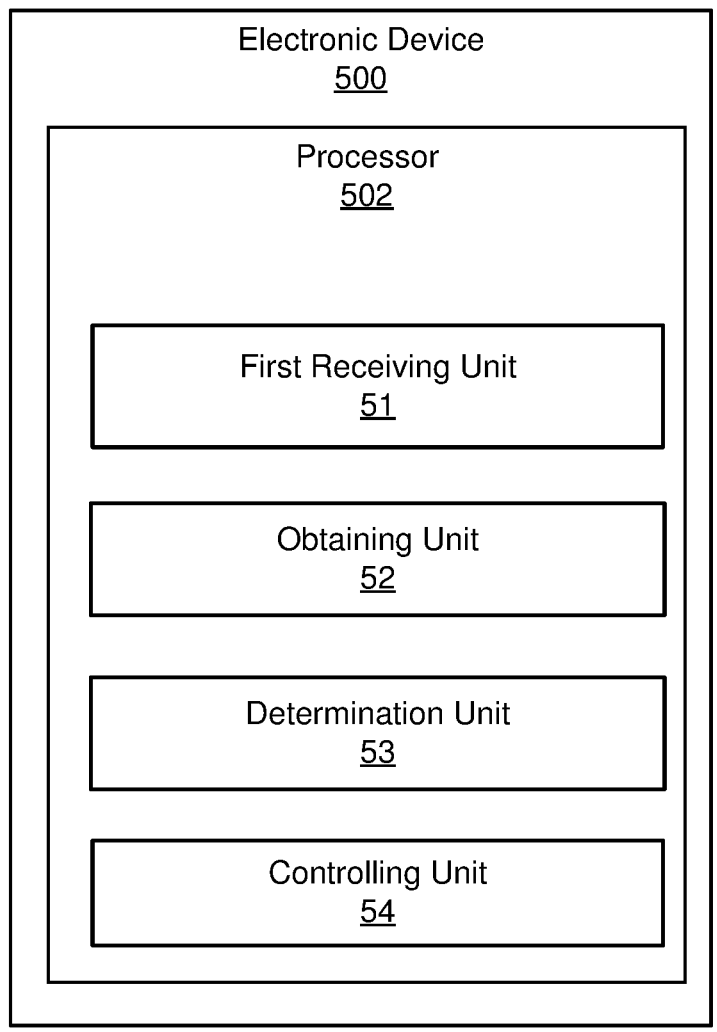
FIG. 5 is schematic block diagram of an embodiment of an electronic device.

FIG. 5 is schematic block diagram of an embodiment of an electronic device 500 (e.g., the first electronic device). As illustrated, the electronic device 500 includes a processor 502 (which may include a first receiving unit 51, an obtaining unit 52, a determination unit 53, and a controlling unit 54). Any of the first receiving unit 51, the obtaining unit 52, the determination unit 53, and the controlling unit 54 may also be considered modules as described herein.

The first receiving unit 51 includes a wireless communication module that receives communication information from a base station. The communication information may be based on customer identification information, and the customer identification information may correspond to identification information obtained in response to a second electronic device registering at the base station.

The obtaining unit 52 obtains user attribute information corresponding to the communication information. The determination unit 53 determines whether the user attribute information is stored in a preset user attribute list. The controlling unit 54 controls, based on a result of determining whether the user attribute information is stored in the preset user attribute list, an authorization of the first electronic device to the communication information.

In one embodiment, the controlling unit 54 may use a first processing strategy to inhibit the first electronic device from processing the communication information in response to determining that the user attribute information is stored in the preset user attribute list.

In certain embodiments, the electronic device 500 includes a first sending unit that sends authorization request information to the second electronic device. In some embodiments, the first receiving unit receives response information from the second electronic device, and determines whether the first electronic device is authorized to process the communication information based on the response information. In various embodiments, the response information is based on the authorization request information.

In certain embodiments, the electronic device 500 includes a generating unit and a second receiving unit. The generating unit is used for generating a request for user input (e.g., a prompt message). The second receiving unit is used for receiving the user input in response to the request. The determination unit 53 may be used for determining whether the first electronic device is authorized to process the communication information based on a comparison between the user input and a preset user input. For example, the first electronic device may be authorized to process the communication information if the comparison between the user input and the preset user input indicates a match between the user input and the preset user input. As another example, the first electronic device may be blocked from processing the communication information if the comparison between the user input and the preset user input indicates there is not a match between the user input and the preset user input.

In some embodiments, the controlling unit 54 may use a second processing strategy to enables the first electronic device to process the communication information in response to determining that the user attribute information is not stored in the preset user attribute list.

Those skilled in the art may understand that functions of respective units in the first electronic device may refer to related descriptions of the foregoing methods 100, 200, 300, and/or 400 applied to the first electronic device, and respective units in the first electronic device may be implemented by a simulation circuit realizing functions of the embodiments of the present disclosure, and may also be realized by operation of software executing functions on an intelligent terminal.

The electronic device 500 may include a processor 502, a memory, an input device, communication hardware, and/or a display device. The input device and the display device may be combined into a single device, such as a touchscreen.

The processor 502, in one embodiment, may include any known controller capable of executing computer-readable instructions and/or capable of performing logical operations. For example, the processor 502 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 502 executes instructions stored in the memory to perform the methods and routines described herein. The processor 502 may be communicatively coupled to the memory, the input device, the communication hardware, and/or the display device.

The memory, in one embodiment, is a computer readable storage medium. In some embodiments, the memory includes volatile computer storage media. For example, the memory may include a RAM, including dynamic RAM ("DRAM"), synchronous dynamic RAM ("SDRAM"), and/or static RAM ("SRAM"). In some embodiments, the memory includes non-volatile computer storage media. For example, the memory may include a hard disk drive, a flash memory, or any other suitable non-volatile computer storage device. In some embodiments, the memory includes both volatile and non-volatile computer storage media.

In some embodiments, the memory stores program code and related data, such as an operating system or other controller algorithms operating on the electronic device 500.

The input device, in one embodiment, may include any known computer input device including a touch panel, a button, a keyboard, a stylus, or the like. In some embodiments, the input device may be integrated with the display device, for example, as a touchscreen or similar touch-sensitive display. In some embodiments, the input device includes a touchscreen such that text may be input using a virtual keyboard displayed on the touchscreen and/or by handwriting on the touchscreen. In some embodiments, the input device includes two or more different devices, such as a keyboard and a touch panel.

The communication hardware may facilitate communication with other devices. For example, the communication hardware may enable communication via Bluetooth®, Wi-Fi, and so forth.

The display device, in one embodiment, may include any known electronically controllable display or display device. The display device may be designed to output visual, audible, and/or haptic signals. In some embodiments, the display device includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device may include a wearable display such as a smart watch, smart glasses, a heads-up display, or the like. Further, the display device may be a component of a smart phone, a personal digital assistant, a television, a table computer, a notebook (laptop) computer, a personal computer, a vehicle dashboard, a streaming device, or the like.

In certain embodiments, the display device includes one or more speakers for producing sound. In some embodiments, the display device includes one or more haptic devices for producing vibrations, motion, or other haptic feedback.

In some embodiments, all or portions of the display device may be integrated with the input device. For example, the input device and display device may form a touchscreen or similar touch-sensitive display. In other embodiments, the display device may be located near the input device. In certain embodiments, the display device may receive instructions and/or data for output from the processor 502.

Figure 6:
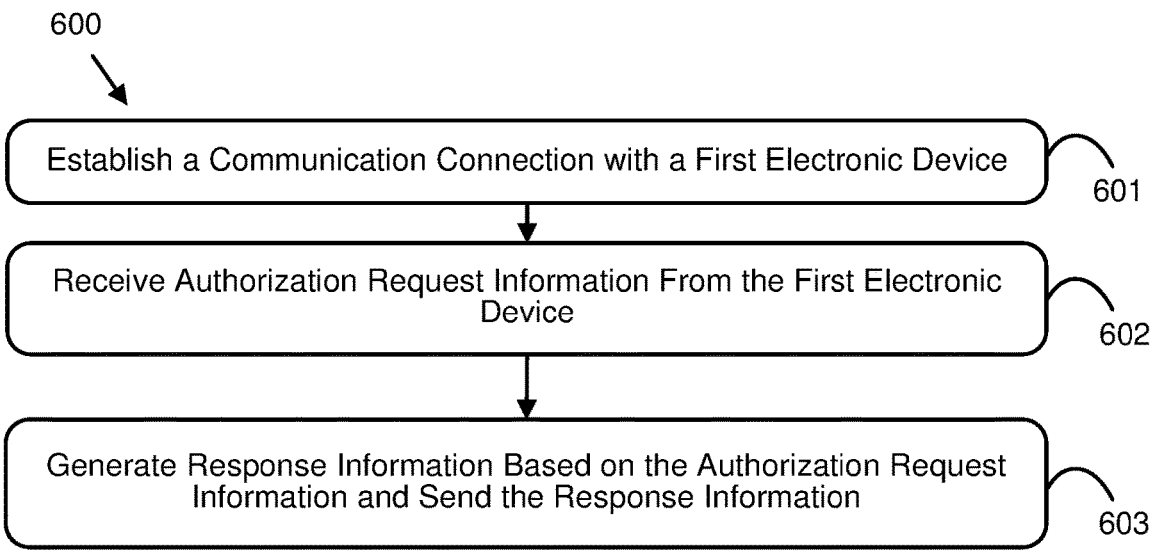
FIG. 6 is schematic flow chart diagram of an additional embodiment of a method for controlling authorization to communication information.

FIG. 6 is schematic flow chart diagram of an additional embodiment of a method 600 for controlling authorization to communication information. The method 600 may be performed by a second electronic device. The method 600 may include establishing 601 a communication connection (e.g., communication link, communication channel) with a first electronic device. The method 600 includes receiving 602 authorization request information from a first electronic device. The authorization request information may be sent to the second electronic device in response to the first electronic device receiving communication information from a base station. The communication information may be based on customer identification information, and the customer identification information may correspond to identification information obtained in response to a second electronic device registering at the base station.

The method includes generating 603 response information based on the authorization request information and sending the response information. The response information may indicate whether the first electronic device is authorized to process the communication information (e.g., indicate to block the first electronic device from processing the communication information, indicate to enable the first electronic device to process the communication information).

In one embodiment, a customer identification module is arranged in the second electronic device. The method 600 may include the second electronic device using the customer identification module to register the second electronic device at the base station based on the customer identification information. The customer identification information may represent identification information corresponding to the second electronic device registering at the base station through the customer identification module.

The second electronic device, in some embodiments, may be an electronic device interacting with the first electronic device according to method 100, 200, 300, and/or 400.

Figure 7:
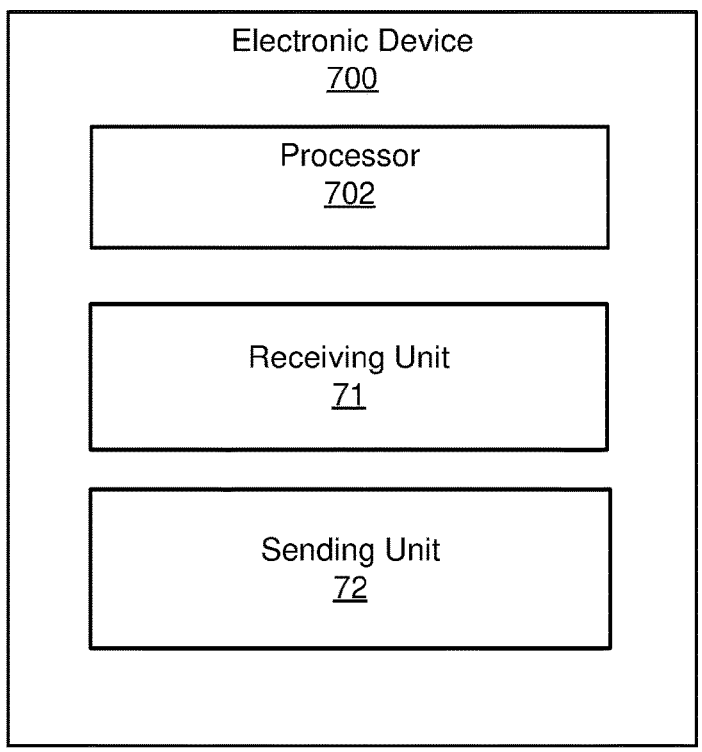
FIG. 7 is schematic block diagram of another embodiment of an electronic device.

FIG. 7 is schematic block diagram of another embodiment of an electronic device 700 (e.g., the second electronic device). The electronic device 700 includes a processor 702, a receiving unit 71, and a sending unit 72.

The receiving unit 71 may receive authorization request information from a first electronic device. The authorization request information may be sent to the second electronic device in response to the first electronic device receiving communication information from a base station. The communication information may be based on customer identification information, and the customer identification information may correspond to identification information obtained in response to a second electronic device registering at the base station.

The sending unit 72 may generate response information based on the authorization request information, and send the response information. The response information may indicate whether the first electronic device is authorized to process the communication information.

In one embodiment, a customer identification module may be arranged in the electronic device 700. Moreover, the electronic device 700 may include a registering unit that registers the electronic device 700 at the base station based on the customer identification information. The customer identification information may represent identification information corresponding to the second electronic device registering at the base station through the customer identification module.

The electronic device 700 may include a processor 702, a memory, an input device, communication hardware, and/or a display device similar to like elements as described in relation to the electronic device 500.

Those skilled in the art may understand that functions of units in the second electronic device may refer to related description of the foregoing method 100, 200, 300, and/or 400 applied to the second electronic device, and respective units in the second electronic device may be implemented by a simulation circuit, and may also be performed by operation of software executing functions on an intelligent terminal.

It may be understood that the devices and methods disclosed in the embodiments of the present disclosure may be implemented in other ways. The device embodiments of the present disclosure are only schematic, in other words, the units are categorized depending on the logic function or in other modes for application, for example: a plurality of units or components may be combined or integrated into another system, or certain characteristics can be omitted or not exercised. Additionally, coupling, direct coupling, or communication connections among the component parts as shown or discussed may be implemented through some interface(s), and indirect coupling or communication connections of devices or units may be in an electrical, mechanical, or other form.

The units as separate components may or may not be physically divided, and components of display units may or may not be physical units and can be positioned in one place or distributed to a plurality of network units, and aims of the solution of the present embodiment can be realized by selecting all or part of the units according to actual demands.

Separately, various functional units of various embodiments in the present disclosure can all be integrated in one processing unit, or each unit may function as a single unit, or two or more units may be integrated in one unit; and the integrated units may be realized by hardware, or by a functional unit with hardware and software.

Those ordinary skilled in the art can understand that all or part of the steps of the method embodiments can be finished by a program instruction-associated hardware, the foregoing program can be stored in a computer-readable storage medium; when the program is executed, the steps of the method embodiments are executed; and the foregoing storage medium comprises: various mediums that can store a program code, such as a portable storage device, a read-only memory (ROM), a random access memory (RAM), a magnetic disk, an optical disc, or the like.

Or, when the integrated functions are implemented in a form of a software functional module and sold or used as an independent product, the functions can be stored in a computer-readable storage medium. Based on such understanding, the technical schemes of the embodiments of the present disclosure can essentially or the parts that contribute to current technology can be embodied in the form of software products. Software products of the computer are stored in one storage media, including numerous commands to make one computer device (likely, a computer, server, or network device, and the like) implement all or part of the methods described in each embodiment of the present disclosure. The foregoing storage medium comprises: various mediums that can store a program code, such as a portable storage device, a read-only memory (ROM), a random access memory (RAM), a magnetic disk, an optical disc, or the like.

The above specification is only made up of specific embodiments of the present disclosure, but a protection scope of the present disclosure is not limited thereto, changes or substitutions easily conceived by anyone familiar with the technical field of the art disclosed by the present disclosure shall fall within a protection scope of the present disclosure. Accordingly, the protection scope of the present disclosure is defined by the claims.

What is claimed is:

1. A method comprising:
   receiving, at a first electronic device, communication information via a wireless communication network;
   obtaining, via the first electronic device, user attribute information corresponding to the communication information;
   determining, via the first electronic device and based on the user attribute information, whether authorization of the first electronic device to the communication information is to be obtained prior to processing the communication information, wherein determining whether authorization of the first electronic device to the communication information is to be obtained prior to processing the communication information comprises:
      comparing the user attribute information to a stored user attribute list;
      in response to the user attribute information not being in the stored user attribute list, determining that authorization of the first electronic device is not to be obtained prior to processing the communication information; and
      in response to the user attribute information being in the stored user attribute list, determining that authorization of the first electronic device is to be obtained prior to processing the communication information; and
   in response to determining that authorization of the first electronic device to the communication information is to be obtained:
      sending, from the first electronic device, an authorization request to a second electronic device to determine whether the first electronic device can process the communication information that corresponds to a subscriber identity module, wherein the first electronic device and the second electronic device share the subscriber identity module, and the subscriber identity module is a physical device located at the second electronic device; and
      processing, via the first electronic device, the communication information in response to receiving a favorable response from the second electronic device, and not processing the communication information in response to receiving an unfavorable response from the second electronic device.

2. The method of claim 1, wherein the communication information is received from a base station, and the communication information is based on customer identification information.

3. The method of claim 2, further comprising obtaining, via the first electronic device, the customer identification information from the second electronic device.

4. The method of claim 1, further comprising:
   generating, via the first electronic device, a request for user input;
   sending, via the first electronic device, the request to the second electronic device;
   receiving, via the first electronic device, the user input; and
   determining, via the first electronic device, whether the first electronic device is authorized to process the communication information based on a comparison between the user input and a preset user input.

5. The method of claim 1, wherein the first electronic device processes the communication information in response to determining that the authorization of the first electronic device to the communication information is not required.

6. The method of claim 2, wherein the customer identification information comprises a telephone number.

7. The method of claim 1, wherein the first electronic device comprises a virtual customer identification module, and the second electronic device comprises a customer identification module.

8. The method of claim 1, wherein the user attribute information corresponds to a user identity.

9. A first electronic device comprising:
   a processor; and
   a wireless communication module coupled to the processor, the wireless communication module configured to receive communication information via a wireless communication network, wherein the processor is configured to:
      obtain user attribute information corresponding to the communication information;
      determine, based on the user attribute information, whether authorization of the first electronic device to the communication information is to be obtained prior to processing the communication information, wherein determining whether authorization of the first electronic device to the communication information is to be obtained prior to processing the communication information comprises:
         comparing the user attribute information to a stored user attribute list;
         in response to the user attribute information not being in the stored user attribute list, determining that authorization of the first electronic device is not to be obtained prior to processing the communication information; and
         in response to the user attribute information being in the stored user attribute list, determining that authorization of the first electronic device is to be obtained prior to processing the communication information; and
      in response to determining that authorization of the first electronic device to the communication information is to be obtained:
         send an authorization request to a second electronic device to determine whether the first electronic device can process the communication information that corresponds to a subscriber identity module, wherein the first electronic device and the second electronic device share the subscriber identity module, and the subscriber identity module is a physical device located at the second electronic device; and
         process the communication information in response to receiving a favorable response from the second electronic device, and not process the communication information in response to receiving an unfavorable response from the second electronic device.

10. The first electronic device of claim 9, wherein the communication information is received from a base station, and the communication information is based on customer identification information.

11. The first electronic device of claim 10, wherein the wireless communication module is further configured to obtain the customer identification information from the second electronic device.

12. The first electronic device of claim 9, wherein the processor is further configured to:
- generate a request for user input for sending to the second electronic device via the wireless communication module;
- receive a response from the second electronic device via the wireless communication module, wherein the response from the second device is based on a comparison between the user input and a preset user input; and
- determine whether the first electronic device is authorized to process the communication information.

13. The first electronic device of claim 9, wherein the processor is configured to process the communication information in response to determining that the authorization of the first electronic device to the communication information is not required.

14. The first electronic device of claim 9, further comprising a virtual customer identification module adapted to rely on information received from the second electronic device via the wireless communication module to connect with the wireless communication network.

* * * * *